United States Patent
Colton et al.

(10) Patent No.: US 10,941,809 B2
(45) Date of Patent: Mar. 9, 2021

(54) PLAIN BEARING WITH IMPROVED RESISTANCE TO WEAR

(71) Applicant: Aktiebolaget SKF, Gothenburg (SE)

(72) Inventors: Michael Brett Colton, Bristol (GB); Jacek Kaminski, Mölnlycke (SE); William Makin, Clutton (GB); Johnpaul Woodhead, Bristol (GB)

(73) Assignee: Aktiebolaget SKF, Gothenburg (SE)

(*) Notice: Subject to any disclaimer, the term of this patent is extended or adjusted under 35 U.S.C. 154(b) by 0 days.

(21) Appl. No.: 16/734,690

(22) Filed: Jan. 6, 2020

(65) Prior Publication Data

US 2020/0224719 A1 Jul. 16, 2020

(30) Foreign Application Priority Data

Jan. 11, 2019 (FR) ........................................ 1900270

(51) Int. Cl.
*F16C 23/04* (2006.01)
*F16C 33/10* (2006.01)
*F16C 17/10* (2006.01)

(52) U.S. Cl.
CPC .......... *F16C 33/1095* (2013.01); *F16C 17/10* (2013.01)

(58) Field of Classification Search
CPC ...... F16C 17/10; F16C 17/105; F16C 23/043; F16C 23/045; F16C 23/046; F16C 33/1095

See application file for complete search history.

(56) References Cited

U.S. PATENT DOCUMENTS

| 3,709,573 A | 1/1973 | Orkin |
| 4,358,167 A | 11/1982 | Magazian |
| 6,991,565 B1 | 1/2006 | Kasashima |
| 7,018,309 B2 | 3/2006 | Kasashima |
| 9,353,792 B2 | 5/2016 | Hachtmann |
| 2003/0022797 A1 | 1/2003 | Oohira |

(Continued)

FOREIGN PATENT DOCUMENTS

| CN | 102678751 A | 9/2012 |
| CN | 103174742 A | 6/2013 |
| CN | 105864284 A | 8/2016 |

(Continued)

OTHER PUBLICATIONS

SKF Group / SKF spherical plain bearings and rod ends / Jan. 9, 2011.

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

Plain bearing providing an outer ring with an inner surface, an inner ring with an outer surface, the rings being symmetrical around an axis and metallic, at least on the rings being a textured ring with a texturation consisting of a plurality of micro-cavities arranged onto a textured surface. A composite self-lubricating composite liner that is interposed between the inner surface of the outer ring and the outer surface of the inner ring, so that upon sliding movement of the textured ring with respect to the composite liner, some solid particles of the liner, acting as a solid lubricant, are detached from the composite liner and migrate between the sliding surfaces until they get retained into the micro-cavities.

9 Claims, 5 Drawing Sheets

(56) References Cited

U.S. PATENT DOCUMENTS

2006/0062502 A1* 3/2006 Hupp .................. F16C 33/24
384/213

FOREIGN PATENT DOCUMENTS

| CN | 107387553 | A |   | 11/2017 |   |
|----|-----------|---|---|---------|---|
| EP | 0189626 | A |   | 8/1986 |   |
| EP | 1524442 | A1 |   | 4/2005 |   |
| EP | 2930381 | A1 |   | 10/2015 |   |
| EP | 2955399 | A1 |   | 12/2015 |   |
| EP | 2955400 | A1 |   | 12/2015 |   |
| JP | 54145836 | A | * | 11/1979 | ............ F16C 23/045 |
| JP | 58217818 | A | * | 12/1983 | ............ F16C 33/107 |
| JP | 2011074979 | A | * | 4/2011 |   |
| WO | WO-2007088143 | A1 | * | 8/2007 | .......... F16C 33/1095 |

\* cited by examiner

PLAIN BEARING WITH IMPROVED RESISTANCE TO WEAR

CROSS-REFERENCE TO RELATED APPLICATIONS

This application claims priority to French Application no. 1900270, filed Jan. 11, 2019, the contents of which are fully incorporated herein by reference.

TECHNICAL FIELD OF THE INVENTION

The invention concerns a plain bearing such as a spherical plain bearing, with an improved resistance to the wear of the rings constituting the plain bearing.

BACKGROUND OF THE INVENTION

Plain bearings are commonly used to support in rotation two rotatable parts at a relatively low rotational speed but usually with high loads applied to the inner and the outer ring of the plain bearing.

In order to increase the life for the plain bearing by increasing the resistance to the wear of the inner and/or outer rings in the area where they come into sliding contact, several improvements have been proposed.

For instance, it is known from EP2930381A1 to dispense anti-wear coatings on at least one of the rings.

It is also known from EP1524442A1 to dispense at least one of the rings with microcavities for hosting some lubricant.

It is also known from EP2955399A1 to equip a spherical plain bearing with non-textured rings with a composite liner interposed between the rings.

Improvements are still possible.

SUMMARY OF THE INVENTION

It is a particular object of the present invention to provide a plain bearing comprising an outer ring with an inner surface, an inner ring with an outer surface and a composite liner interposed between the inner and outer surfaces.

According to the invention, at least one the outer surface and the inner surface defines a textured ring with a texturation surface with a texturation formed by micro-cavities.

Still according to the invention, the plain bearing comprises a composite self-lubricated composite liner which is interposed between the inner surface of the outer ring and the outer surface of the inner ring and from which solid particles acting as a solid lubricant, upon sliding movement of the textured ring with respect to the composite liner, detach and migrate until they got retained into the micro-cavities.

Thanks to the invention, the wear of the textured ring is reduced, and the life of the plain bearing is extended.

In use, when the inner and outer rings of the plain bearing rotate with respect to each other, shear stresses are generated onto the composite self-lubricating liner. As a consequence, solid particles of the composite liner are detached from the composite liner and migrate between the sliding surfaces until they get retained into the micro-cavities. These particles act as a solid lubricant.

According to other aspects of the invention which are advantageous but not compulsory, such a plain bearing may incorporate one or several of the following features:

the micro-cavities are arranged on the outer surface of the inner ring and the composite liner is solider in rotation with the outer ring;

the composite liner comprises either a woven fabrics and a resin, the woven fabric comprising structural warp yarns made of glass and lubricating warp yarns made of PTFE, the resin being of the epoxy or phenolic type, or a molded resin containing a mixture of resin and PTFE base material with added structural fillers;

the micro-cavities are identical and spaced apart in a uniform manner;

a texturation density of the textured ring, defined as being the ratio between the cumulative surface area of the micro-cavities and the total surface area of the textured surface, is comprised between 0.5% and 6.4%;

in cross section with respect to a direction perpendicular to the textured surface, the micro-cavities define a shape which can be for instance circular, elliptic and/or rectangular, which shape having a maximum length (L) in cross section comprised between 20 and 100 microns;

each micro-cavity has a depth comprised between 2 and 30 microns;

for each micro-cavity the ratio between its depth E and its maximum length L is smaller than or equal to 0.25;

the plain bearing is a spherical plain bearing;

an anti-wear coating is applied to the textured surface after texturization.

BRIEF DESCRIPTION OF THE FIGURES

The present invention and its advantages will be better understood by studying the detailed description of specific embodiments given by way of non-limiting examples and illustrated by the appended drawings on which.

DETAILED DESCRIPTION OF THE INVENTION

Figure 1:
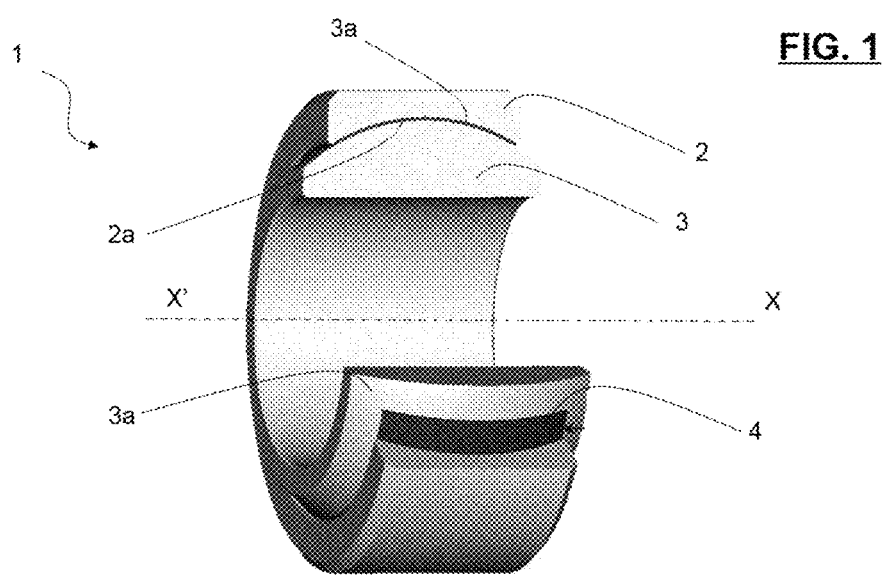
FIG. 1 shows a preferred embodiment of a plain bearing according to the invention.

FIG. 1 illustrates a plain bearing 1 comprising an outer ring 2 and an inner ring 3. Both rings are symmetrical around an axis XX' and are metallic. The outer ring 2 has, on its inner periphery, an inner surface 2a, and the inner ring has, on its outer periphery, an outer surface 3a. The inner and outer surfaces are facing each other, and a composite self-lubricating composite liner 4 is interposed there between.

The composite self-lubricating composite liner 4 is made from composite material, for instance as described in EP2955399A1. The composite liner comprises either woven fabrics and a resin, or a molded resin with structural fillers. The woven fabric comprises structural warp yarn and lubricating warp yarn. The molded resin consists of a thermo or thermoset resin with short fibers added in a mixing process.

In a preferred embodiment of the invention, the resin is of the epoxy or phenolic type, the structural warp yarn is made of glass and the lubricating warp yarn is made of PTFE, which is a well-known solid lubricant. The molded resin consists of either a thermo or thermoset plastic with glass or carbon fibers.

At least one of the inner surface of the outer ring and the outer surface of the inner ring comprises a texturation consisting of a plurality of micro-cavities 5 arranged onto the inner and/or the outer surface. A textured surface 6 is thus obtained onto a textured ring.

Figure 2:
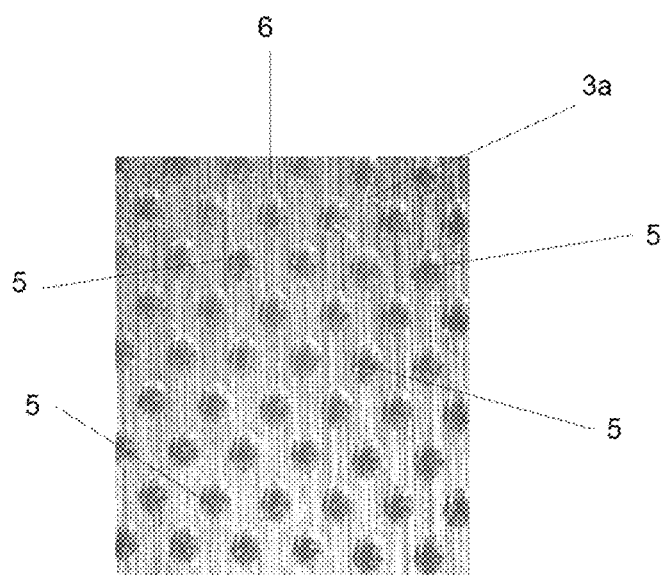
FIG. 2 shows in detail a partial view of a textured surface of a ring of a plain bearing according to the invention.

As illustrated on FIG. 2, the micro-cavities 5 open up to the textured surface 6. Also, the micro-cavities are spaced apart from each other and do not communicate with each other.

A density of texturation D is defined by the ratio between the cumulative surface area occupied by the micro-cavities 5 and the total surface area of the textured surface.

Preferably, the texturation density is smaller than 20%, to avoid a plastic deformation of the composite liner surface.

Preferably, the texturation density is smaller than 10%, to avoid a plastic deformation of the composite liner surface when the plain bearing is submitted to significantly high external loads.

Preferably, the texturation density is comprised between 0.5% and 6.4%. Indeed, in that range, the wear of the composite liner is reduced.

In a preferred embodiment of the invention, the texturation density is approximately equal to 1.6%.

In a preferred embodiment of the invention, the micro-cavities are identical and spaced apart in a uniform manner.

Figure 3:
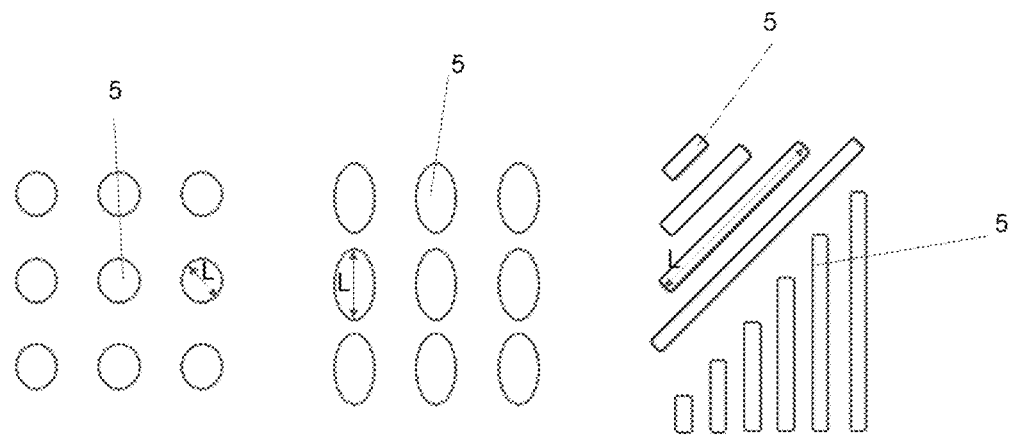
FIG. 3 shows different embodiments of micro-cavity pattern.

FIG. 3 illustrates different patterns of micro-cavities, as seen in a direction perpendicular to the textured surface. In cross section with respect to this direction, the micro-cavities define a shape which can be for instance circular, elliptic and/or rectangular.

Advantageously, still in the cross section defined before, the shape of each micro-cavity has a maximum length L comprised between 20 and 100 microns.

Furthermore, advantageously, each micro-cavity has a depth E comprised between 2 and 30 microns.

In a preferred embodiment of the invention, the micro-cavities are shallow because their depth E is much smaller than their maximum length L. Preferably, the ratio between the depth E and the maximum length L is smaller than or equal to 0.25.

In the preferred embodiment of the invention visible on FIG. 2, the textured surface of the textured ring looks like the surface of a golf ball.

In a preferred embodiment of the invention, the texturation is arranged on the outer surface of the inner ring and the composite liner is solider in rotation with the outer ring.

In a preferred embodiment, an anti-wear coating is applied to the textured surface after the texturation has been done on the sliding surface.

Preferably, the anti-wear coating is made of Chromium Nitride and is applied by physical vapor deposited (PVD) process.

Alternatively, other materials and deposition processes can be used.

In the illustrated example of the invention, the plain bearing is a spherical plain bearing, that is the inner surface of the outer ring is spherical and so is the outer surface of the inner ring.

The texturation can be obtained for instance according to the method described in EP1524442A1.

In use, when the inner and outer rings of the plain bearing rotate with respect to each other, shear stresses are generated onto the composite liner. As a consequence, solid particles of the composite liner are detached from the composite liner and migrate between the sliding surfaces. Some of these solid particles are microscopic and get retained into the micro-cavities of the textured surface. These particles act as a solid lubricant.

Liquid particles such as oil can also be stored in the micro-cavities.

Figure 4:
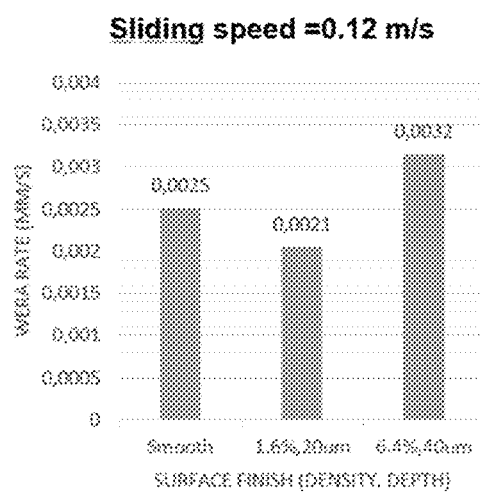
FIG. 4 shows the plots of the results of different wear tests.
Figure 5:
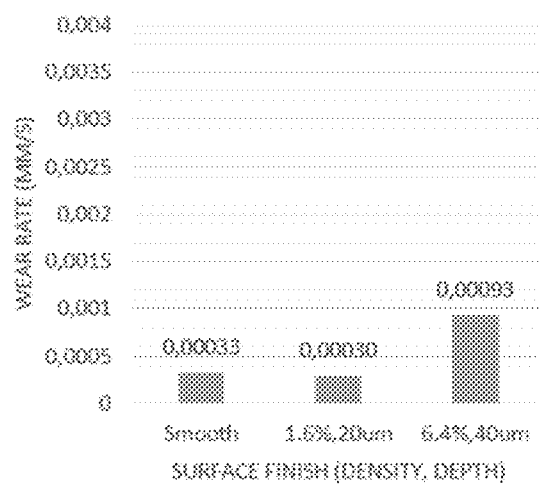
FIG. 5 shows the plots of the results of different wear tests

FIGS. 4 and 5 illustrates the plots of results of several wear tests which are now going to be described.

The tests have been realized on a reciprocating test bench, benchmarking the standard SKF X1-40 self-lubricating composite liner against several metallic surface finishes and at two different sliding speeds: 0.12 m/s (see FIGS. 4) and 0.06 m/s see FIG. 5). The pressure applied between the composite liner and the several finishes has been constant throughout the tests, whatever the sliding speed. The pressure has been set to 40 MPa.

The several surface finishes tested were:

A smooth surface i.e. no texturation;

A textured surface with a texturation density of 1.6% and micro-cavities with a depth of 20 microns;

A textured surface with a texturation density of 6.4% and micro-cavities with a depth of 40 microns.

FIGS. 4 and 5 show that at a higher sliding speed, a surface, be it smooth or textured, wears faster. This result was expectable.

FIGS. 4 and 5 show that a textured surface doesn't necessarily wears less than a smooth surface. Indeed, for the textured surface with a texturation density of 6.4% and micro-cavities with a depth of 40 microns, for both sliding speeds, the wear rate is higher than for the smooth surface. This is surprising because one could expect that thanks to the micro-cavities, more solid lubricant particles coming from the composite liner could be kept available between the sliding surfaces, hence lowering the wear rate.

Actually, this is the case for the textured surface with a texturation density of 1.6% and micro-cavities with a depth of 20 microns, for both sliding speeds. For that textured surface, the wear rate is smaller than for a smooth surface.

The tests prove that the depth of the micro-cavities has a significant influence on the wear rate of the textured surface.

The test also prove that the texturation density has a significant influence on the wear rate of the textured surface.

Thanks to the invention, even when the composite liner has worn out partially or completely, that is to say when it does not separate anymore the metallic inner surface of the outer ring and the metallic outer surface of the inner ring, the remaining solid particles trapped in the micro-cavities can at least partly delay the moment when the metallic surfaces will come into contact and prolong the lubrication of the plain bearing and therefore its life.

LIST OF REFERENCE SIGNS

XX' axis
D texturation density
E depth
L length
D diameter
1 plain bearing
2 outer ring
2a inner surface
3 inner ring
3a outer surface
4 composite self-lubricating liner
5 micro-cavities
6 textured surface

The invention claimed is:

1. Plain bearing comprising: an outer ring with an inner surface, an inner ring with an outer surface, the rings being symmetrical around an axis and are metallic, at least one the rings being a textured ring with a texturation consisting of a plurality of micro-cavities arranged onto a textured surface, and a composite self-lubricating composite liner that is interposed between the inner surface of the outer ring and the outer surface of the inner ring, so that upon sliding movement of the textured ring with respect to the composite liner, some solid particles of the liner, acting as a solid lubricant, are detached from the composite liner and migrate between the sliding surfaces until said some particles are retained into the micro-cavities.

2. Plain bearing according to claim 1, wherein the composite liner comprises either a woven fabric and a resin, the woven fabric comprising structural warp yarns made of glass and lubricating warp yarns made of PTFE, the resin being of the epoxy or phenolic type, or a molded resin containing a mixture of resin and PTFE base material with added structural fillers.

3. Plain bearing according to claim 1, wherein the micro-cavities are identical and spaced apart in a uniform manner.

4. Plain bearing according to claim 1, wherein a texturation density of the textured ring, defined as being the ratio between a cumulative surface area of the micro-cavities and a total surface area of the textured surface, is comprised between 0.5% and 6.4%.

5. Plain bearing according to claim 1, wherein in cross section with respect to a direction perpendicular to the textured surface, the micro-cavities define a shape that is one of circular, elliptic and/or rectangular, and wherein the shape has a maximum length (L) in cross section comprised between 20 and 100 microns.

6. Plain bearing according to claim 1, wherein each of the micro-cavities has a depth comprised between 2 and 30 microns.

7. Plain bearing according to claim 1, wherein for each of the micro-cavities a ratio between a depth E and a maximum length L is less than or equal to 0.25.

8. Plain bearing according to claim 1, further comprising a spherical plain bearing.

9. Plain bearing according to claim 1, wherein an anti-wear coating is applied to the textured surface after the texturization.

* * * * *